United States Patent
Michalec et al.

(10) Patent No.: US 6,849,686 B2
(45) Date of Patent: *Feb. 1, 2005

(54) POLYMERIC PIGMENT DISPERSANT UTILIZED AS A GRIND RESIN FOR PIGMENTS AND METHOD OF PREPARING THE SAME

(75) Inventors: Joseph F. Michalec, Columbus, OH (US); Swaminathan Ramesh, Canton, MI (US); Paul J. Harris, West Bloomfield, MI (US)

(73) Assignee: BASF Corporation, Southfield, MI (US)

( * ) Notice: Subject to any disclaimer, the term of this patent is extended or adjusted under 35 U.S.C. 154(b) by 569 days.

This patent is subject to a terminal disclaimer.

(21) Appl. No.: 09/963,951

(22) Filed: Sep. 25, 2001

(65) Prior Publication Data

US 2002/0123552 A1 Sep. 5, 2002

Related U.S. Application Data

(63) Continuation-in-part of application No. 09/747,474, filed on Dec. 22, 2000, and a continuation-in-part of application No. 09/747,472, filed on Dec. 22, 2000.

(51) Int. Cl.[7] .............................................. C08L 62/00
(52) U.S. Cl. .................... 524/601; 524/602; 252/363.5; 560/127; 562/509
(58) Field of Search .................... 524/601, 602; 252/363.5; 560/127; 562/509

(56) References Cited

U.S. PATENT DOCUMENTS

| 5,378,762 A | 1/1995 | Czornij et al. ............. 525/187 |
| 5,389,139 A | 2/1995 | Carpenter et al. .......... 106/404 |
| 5,424,354 A | 6/1995 | Simms et al. ............... 525/170 |
| 5,603,865 A | 2/1997 | DePue et al. ............ 252/313.1 |
| 5,629,374 A | 5/1997 | Budde et al. ............... 524/549 |
| 5,684,078 A | 11/1997 | Pfaffenschlager et al. .. 524/457 |
| 5,786,420 A | 7/1998 | Grandhee ...................... 525/7 |

FOREIGN PATENT DOCUMENTS

| EP | 0 803 556 | 12/1995 | ......... C09D/133/14 |

OTHER PUBLICATIONS

English Language International Search Report for PCT/US 02/24163, International Filing Date Jul. 23, 2002, p. 1–3.

*Primary Examiner*—Edward J. Cain

(57) ABSTRACT

The present invention is directed to a polymeric pigment dispersant to be used as a grind resin to incorporate pigment into a pigment dispersion for a coating composition. The polymeric pigment dispersant is the reaction product of dipentaerylthritol, hexahydrophthalic anhydride, glycidylneodecanoate, dimethylethanolamine, and polyphosphoric acid. The present invention is also directed to a method of preparing the polymeric pigment dispersant. In this method, the dipentaerythritol and the hexahydrophthalic anhydride are polymerized to form an intermediate compound. Next, an epoxy group of the glycidylneodecanoate reacts with the intermediate compound, and then the dimethylethanolamine salts the intermediate compound. Finally, the polyphosphoric acid is added to form the completed polymeric pigment dispersant. The polymeric pigment dispersant has improved stability in the pigment dispersion and is utilized for efficient wetting and grinding of the pigment in the pigment dispersion.

71 Claims, No Drawings

POLYMERIC PIGMENT DISPERSANT UTILIZED AS A GRIND RESIN FOR PIGMENTS AND METHOD OF PREPARING THE SAME

RELATED APPLICATIONS

This is a continuation-in-part of co-pending U.S. patent application Ser. Nos. 09/747,474 and 09/747,472, both filed Dec. 22, 2000.

FIELD OF THE INVENTION

The subject invention generally relates to a pigment dispersion utilized in coating compositions. More specifically, the subject invention relates to a polymeric pigment dispersant for a pigment and a method of preparing the polymeric pigment dispersant.

BACKGROUND OF THE INVENTION

Coating compositions typically include a primary binder resin, a cross-linking agent, a pigment or pigments to improve the aesthetics of the coating composition, and other coating additives such as solvents, flow and appearance control agents, fillers such as extender pigment, and the like.

It is understood in the art that the pigment is incorporated into the coating compositions via a pigment dispersion. The pigment dispersion is derived from dispersion of the pigment into a pigment dispersant. More specifically, a mill, such as a ball mill, grind mill, or continuous mill, is utilized to incorporate the pigment into the pigment dispersant. The mill integrates the pigment into the pigment dispersant until a desired particle size of the pigment is achieved, and until the pigment is appropriately wetted by the pigment dispersant and uniformly dispersed throughout the pigment dispersant.

The pigment dispersants of the prior art including, but not limited to, polyacrylate-based emulsions, have proven to be inadequate for use as a pigment dispersant for dispersing pigment usable in coating compositions. The pigment dispersants of the prior art are ineffective because these resins are unable to withstand mechanical forces exerted by the mill when integrating the pigment. These pigment dispersants are also deficient in wetting the pigment and in maintaining the pigment dispersed throughout the pigment dispersant. Instead, with the pigment dispersants of the prior art, such as the polyacrylate-based emulsion pigment dispersant, the pigment tends to coagulate or settle resulting in poor stability and inadequate 'shelf life' of the pigment dispersion. One aspect of poor stability results from having a pH which is too basic. The pigment dispersants having high pH values tend to show increased coagulation and decreased 'shelf life' of the pigment dispersion.

These prior art pigment dispersants also tend to have increased viscosities and, as understood in the art, increased viscosities typically inhibit the amount of pigment that can be incorporated into the pigment dispersant. As a result, pigment dispersions that utilize the pigment dispersants of the prior art cannot attain sufficient pigment-to-binder ratios while maintaining acceptable gloss and appearance in a film of the coating compositions. Also, due to the increased viscosity, these pigment dispersants often require solvent and other additives which increases the overall volatile content of the pigment dispersion—a characteristic that is undesirable throughout the coating industry.

In sum, the prior art pigment dispersants, as detailed above, are characterized by one or more inadequacy. Due to the inadequacies identified in the prior art, it is desirable to provide a polymeric pigment dispersant to be utilized as a grind resin for inorganic pigments and a method of preparing the polymeric pigment dispersant. It is advantageous that the polymeric pigment dispersant according to the subject invention has improved stability, effectively wets pigment, uniformly disperses pigment, provides increased pigment-to-binder ratios, and increases pigment loading accompanied with acceptable gloss and appearance in the film of the coating composition.

SUMMARY OF THE INVENTION

A polymeric pigment dispersant having improved stability in a pigment dispersion is disclosed. The polymeric pigment dispersant of the subject invention is utilized as a grind resin to incorporate pigments into the pigment dispersion for coating compositions. The polymeric pigment dispersant is the reaction product of a first compound having a plurality of first hydroxyl groups, a carboxylic acid anhydride reactive with the first hydroxyl groups to form a carboxylate group, a second compound having at least one epoxy group reactive with the carboxylate group to form a second hydroxyl group, an amine reactive with the carboxylate group to form an acid anion group for salting the carboxylate group, and an acid for controlling a pH of the polymeric pigment dispersant such that the polymeric pigment dispersant has improved stability in the pigment dispersion in response to the modification of the pH.

A method of preparing the polymeric pigment dispersant having improved stability in the pigment dispersion for achieving efficient wetting and grinding of the pigment in the pigment dispersion is also disclosed. The method includes the steps of reacting the first compound having the plurality of first hydroxyl groups with the carboxylic acid anhydride to form the intermediate compound having the plurality of carboxylate groups. Once the intermediate compound is formed, the second compound having at least one epoxy group is reacted with at least one of the carboxylate groups of the intermediate compound forming at least one second hydroxyl group. The amine is then reacted with at least one of the other carboxylate groups of the intermediate compound. Finally, the acid is reacted with at least one of the first and the second hydroxyl groups thereby forming the polymeric pigment dispersant and improving the stability of the pigment dispersion.

It is an object of the subject invention to develop a pigment dispersant that has a relatively low molecular weight and a correspondingly low viscosity such that increased pigment-to-binder ratios and increased pigment loading can be achieved while maintaining a low viscosity for the pigment dispersion. More specifically, as a result of the relatively low viscosity of the pigment dispersant of the subject invention, higher concentrations of pigments can be incorporated into the pigment dispersant to attain the increased pigment-to-binder ratios of the pigment dispersion. Due to the higher concentration of pigment, a solid, into the pigment dispersant, the volatile content of the pigment dispersion, and of the overall coating composition, is decreased. Also, even at the increased pigment-to-binder ratios, this pigment dispersant demonstrates superior pigment dispersion stability through extended shelf life of the pigment dispersion, and this pigment dispersant is able to be completely dispersed into water with little or no co-solvent required to promote dispersibility. This pigment dispersant is also suitable for achieving optimal appearance characteristics, such as distinctiveness and gloss, in a film of the coating composition. The pigment dispersant is also capable of being used universally as a pigment dispersant for coating compositions of varying chemical technologies.

DETAILED DESCRIPTION OF THE INVENTION

The polymeric pigment dispersant of the subject invention is utilized as a grind resin to incorporate pigments into a pigment dispersion for a coating composition. Examples of inorganic pigments that are utilized in coating compositions include, among other inorganic pigments, titanium dioxide, $TiO_2$, and iron oxide, FeO, as well as certain aluminum and mica flake pigments. Other pigments that may be utilized with the polymeric pigment dispersant include, but are not limited to, copper phthalocyanine-based greens and blues, quinacridone red, iron oxide yellow, dirarylide yellow, perinone orange, indanthrene blue, cromophthal red, irgazine orange, and heliogen green.

It is to be understood that the terms polymeric pigment dispersant and grind resin will be used interchangeably throughout the subject application. The polymeric pigment dispersant includes a highly-branched organic structure having various functionalities that promote efficient wetting of the inorganic pigment and optimal stability of the pigment in the grind resin of the pigment dispersion in the coating composition. These various functionalities will be introduced and described below.

The polymeric pigment dispersant is generally the reaction product of a first compound having a plurality of first hydroxyl groups, a carboxylic acid anhydride, a second compound having at least one epoxy group, an amine, and an acid. The method of preparing the polymeric pigment dispersant includes the steps of reacting, by polymerizing, the first compound with the carboxylic acid anhydride to form an intermediate compound having a plurality of carboxylate groups, and then reacting the second compound and then the amine with the carboxylate groups of the intermediate compound to form a second hydroxyl group. One second hydroxyl group is formed for each mole of the second compound that is reacted with the carboxylate groups. Therefore, two carboxylate groups can be reacted to form two second hydroxyl groups, and so on. The acid is then added to control pH and to form the polymeric pigment dispersant of the subject invention. The acid also allows for increased wetting of the pigment. The reaction step including the amine salts, or neutralizes, the carboxylate groups of the intermediate compound. The method steps of the subject invention are preferably conducted at temperatures between 50° C. and 200° C., more preferably between 100° C. and 170° C. This method will be described in further detail below.

To prepare the polymeric pigment dispersant, the first compound is selected to maximize the number of first hydroxyl groups, i.e., the hydroxyl functionality, in the first compound while establishing a foundation for the highly-branched organic structure of the polymeric pigment dispersant. The first hydroxyl groups of the first compound can be primary, secondary, and tertiary hydroxyl groups. Also, the first compound is soluble in water and is present in the polymeric pigment dispersant in an amount from 1 to 20, preferably from 7 to 15, parts by weight based on 100 parts by weight of the polymeric pigment dispersant.

The first compound is more specifically selected from the group consisting of erythritol, pentaerythritol, dipentaerythritol, trimethylolethane, trimethylolpropane, dulcitol, threitol, and mixtures thereof. As understood by those skilled in the art, trimethylolethane and trimethylol-propane each provide three hydroxyl groups, erythritol and threitol each provide four hydroxyl groups, and dipentaerythritol and dulcitol each provide six hydroxyl groups. In the preferred embodiment of the subject invention, the first compound is dipentaerythritol.

For descriptive purposes, a chemical representation of dipentaerythritol is disclosed below.

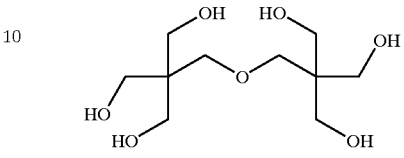

As shown above, dipentaerythritol is a compound having a central oxygen atom with a total of six hydroxyl groups.

The polymeric pigment dispersant of the subject invention can be prepared with a compound having as few as two hydroxyl groups. Other equivalent compounds include, but are not limited to, ethylene glycol and propylene glycol, which each provide two hydroxyl groups, and glycerol, which provides three hydroxyl groups. Other alcohols, sugars, and acids providing a plurality of hydroxyl groups are also suitable as the first compound.

The number of moles of carboxylic acid anhydride that is polymerized with the first compound is selected to optimize the number of carboxylate groups, i.e., the acid functionality, that can be formed in the intermediate compound and also to contribute to the highly-branched organic structure of the polymeric pigment dispersant. The carboxylic acid anhydride may be either an aromatic or non-aromatic cyclic anhydride. The carboxylic acid anhydride is preferably selected from, but not limited to, the group consisting of maleic anhydride, hexahydrophthalic anhydride, methylhexahydrophthalic anhydride, tetrahydrophthalic anhydride, phthalic anhydride, succinic anhydride, dodecenylsuccinic anhydride, trimellitic anhydride, and mixtures thereof. In the preferred embodiment of the subject invention, the carboxylic acid anhydride is hexahydrophthalic anhydride. For descriptive purposes, a chemical representation of hexahydrophthalic anhydride is disclosed below.

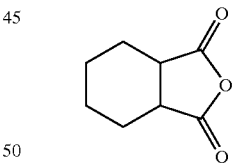

As shown above, the hexahydrophthalic anhydride provides an acid functionality whereby one carboxylic acid group can be formed into the intermediate compound per mole of the carboxylic acid anhydride introduced.

The carboxylic acid anhydride is present in the polymeric pigment dispersant in an amount from 15 to 45, preferably from 20 to 35, parts by weight based on 100 parts by weight of the polymeric pigment dispersant. Also, the molar ratio of the carboxylic acid anhydride to the first compound present in the polymeric pigment dispersant is from 2:1 to 20:1, preferably from 2:1 to 6:1, and more preferably 3:1 to 5:1. More specifically, the molar ratio of the carboxylic acid anhydride, hexahydrophthalic anhydride, that is reacted with the first compound, dipentaerythritol, is 5:1. That is, five moles of hexahydrophthalic anhydride are reacted with one mole of dipentaerythritol to form the intermediate compound. The molecular weight of the compounds having the molar ratio of 5:1 is from about 1300 to about 2000. However, in the preferred embodiment, the increased stability of the subject invention is also achieved when the molar ratio of the hexahydrophthalic anhydride to the dipentaerythritol is 3:1. The molecular weight of the compound having the molar ratio of 3:1 is from about 800 to about 1200. For descriptive purposes, a chemical representation of the intermediate compound formed by the reaction of one mole dipentaerythritol and five moles of hexahydrophthalic anhydride is disclosed below.

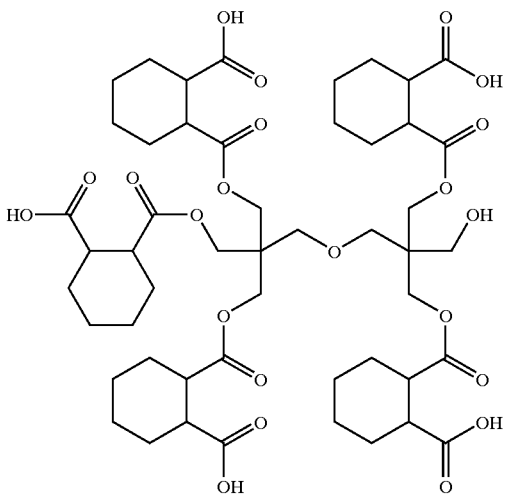

Alternately, a chemical representation of intermediate compound formed by the reaction of one mole dipentaerythritol and three moles of hexahydrophthalic anhydride is disclosed below.

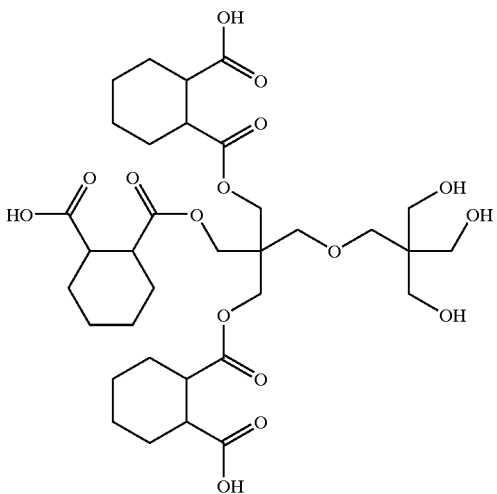

The intermediate compound that is formed with the 5:1 molar ratio, is a pentacarboxylic acid compound, i.e., a compound including five carboxylate groups or an acid functionality of five. The intermediate compound has one of the first hydroxyl groups unreacted. These five carboxylate groups of the intermediate compound are formed when the anhydride rings of the five moles of hexahydrophthalic anhydride open forming ester linkages with the dipentaerythritol, and the hydrogen atoms from the five hydroxyl groups of the dipentaerythritol react with the oxygen atoms originally from the anhydride rings of the five moles of hexahydrophthalic anhydride thereby forming the pentacarboxylic acid intermediate compound according to the preferred embodiment. As stated above, the intermediate compound of the preferred embodiment has an acid functionality of three. Of course, it is to be understood that the acid functionality can decrease or increase depending upon the selection of the particular first compound and of the particular number of moles of carboxylic acid anhydride, and upon equivalent weight ratios between the first compound and the carboxylic anhydride.

The chemical representation of the intermediate compound disclosed above is merely illustrative of the subject invention. The intermediate compound disclosed above has a six-branch organic structure originally derived from the organic structure of the dipentaerythritol. It is to be understood that if an alternative first compound is selected, such as pentaerythritol which, as described above, provides four hydroxyl groups, then the intermediate compound would have a four-branch organic structure derived from the structure of the pentaerythritol. Of course, four moles of hexahydrophthalic anhydride then would be selected to react with the four hydroxyl groups of the pentaerythritol. Additionally, fewer than four moles of hexahydrophthalic anhydride may be used depending on the desired molecular weight of the grind resin. Decreasing the moles of anhydride decreases the molecular weight and provides a less viscous dispersant.

To prepare the polymeric pigment dispersant of the subject invention, the second compound is reacted with at least one of the carboxylate groups of the intermediate compound. More specifically, it is the epoxy group of the second compound that reacts with one of the carboxylate groups of the intermediate compound. The second compound is selected to include at least one epoxy group, and is present in the polymeric pigment dispersant in an amount from 7 to 30, preferably from 7 to 25, parts by weight based on 100 parts by weight of the polymeric pigment dispersant. The second compound is further selected to include from 6 to 20, preferably from 10 to 15, carbon atoms such that the miscibility between the polymeric pigment dispersant, including the second compound, and a binder resin of the coating composition is maximized. As such, the second compound is selected from the group consisting of glycidylneodecanoate, dodecyl oxide, tetradecyl oxide, octadecyl oxide, and cyclohexene oxide, and mixtures thereof. In view of the above characteristics of the second compound, other equivalent compounds include, but are not limited to, epoxy-containing aromatic hydrocarbons such as bisphenol A monoglycidyl ether.

In the preferred embodiment of the subject invention, the second compound is glycidylneodecanoate. As is known in the art, glycidylneodecanoate is commercially available from Miller-Stephenson Chemical Company, Inc. under its CARDURA® product line, as CARDURA E 10S. For descriptive purposes, a chemical representation of glycidylneodecanoate is disclosed below.

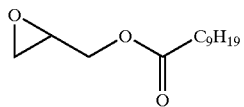

As shown above, glycidylneodecanoate includes one epoxy group. As described above, two moles of glycidylneodecanoate are reacted with two of the five carboxylate groups of the intermediate compound. It is to be understood that the number of moles of glycidylneodecanoate may be modified depending upon the number of moles of the carboxylic acid anhydride used, such as one mole of glycidylneodecanoate with three moles of carboxylic acid anhydride, as in the preferred embodiment. More specifically, the epoxy ring of each glycidylneodecanoate opens such that one of the two carbon atoms, originally in the epoxy ring of the glycidylneodecanoate, reacts and bonds with an oxygen atom from one of the hydroxyls of the carboxylate groups of the intermediate compound. The epoxy ring may also react with one of the first hydroxyl groups. It is to be understood that in the reaction, that each of the epoxy rings can open in one of two manners such that either one of the carbon atoms of the epoxy ring reacts and bonds with the oxygen atom from the hydroxyl of the carboxylic acid group. In one manner, the completed dispersant includes a primary second hydroxyl group, and in a second manner, the completed dispersant includes a secondary second hydroxyl group. The two manners of epoxy ring opening are represented below in the alternative forms of the completed polymeric pigment dispersant.

Next, the amine is reacted with the rest of the carboxylate groups of the intermediate compound. The amine is present in an aqueous solution and is added into the dispersant as the aqueous solution. This reaction step is a salting reaction. It is the nitrogen atom of the amine that reacts with the other of the carboxylate groups of the intermediate compound. Specifically, the nitrogen atom of the amine reacts with the hydrogen atoms from the carboxylate groups of the intermediate compound. Additional amine may also be added in a different and later step to control the final pH of the dispersant. The amine is selected to be miscible in water and is selected from the group consisting of dimethylethanolamine, amino methyl propanol, and mixtures thereof. In view of the above characteristics of the amine, other equivalent compounds include, but are not limited to, $NH_3$, alkanolamines, primary, secondary, and tertiary alkyl amines such as ethylamine, diethylamine, and triethylamine, respectively. In the preferred embodiment of the subject invention, the amine is an alkanolamine, specifically dimethylethanolamine. For descriptive purposes, a chemical representation of dimethylethanolamine is disclosed below.

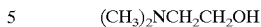

$(CH_3)_2NCH_2CH_2OH$

The amine is present in the polymeric pigment dispersant in an amount from 5 to 35, preferably from 7 to 25, parts by weight based on 100 parts by weight of the polymeric pigment dispersant. Also, the amount of the amine added is dependent on both the number of moles of the second compound and the number of moles of carboxylic acid anhydride. The molar ratio of amine to the second compound is from 1:1 to 20:1, and the molar ratio of amine to the carboxylic acid anhydride is from 1:1 to 4:6. Specifically, in the preferred embodiment, when three moles of acid anhydride are used, one mole of the second compound is used. Therefore, two moles of amine are required and the ratio of amine to the second compound is 2:1. The ratio of amine to the carboxylic acid anhydride is 1:1.5.

In one embodiment, three moles of dimethylethanolamine react with the remaining three of the five carboxylate groups of the intermediate compound. That is, the dimethylethanolamine reacts with the hydroxyls of the three carboxylate groups that did not previously react with the glycidylneodecanoate. More specifically, this reaction step is a salting step whereby the nitrogen atoms from the three moles of dimethylethanolamine neutralize these three carboxylate groups of the intermediate compound. A chemical representation of the reaction product prior to adding the acid is disclosed below.

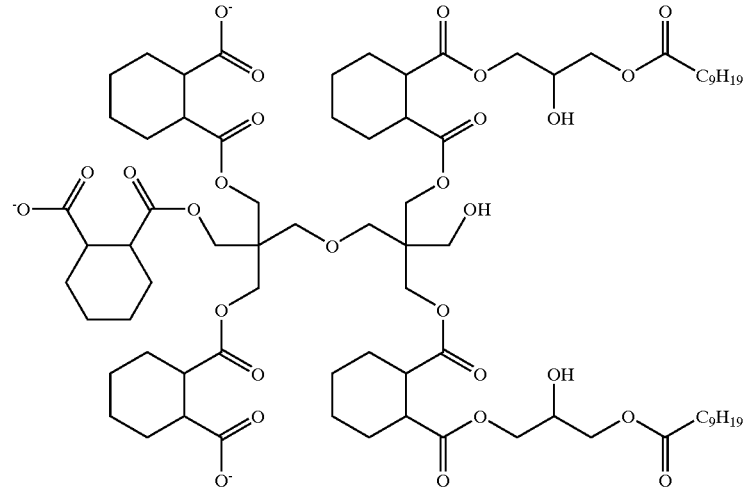

As shown above, the polymeric pigment dispersant includes the secondary second hydroxyl group, as described above, that results from the particular manner of epoxy ring opening of the glycidylneodecanoate. However, as described previously, the polymeric pigment dispersant can also result in the primary second hydroxyl group that results from a second manner of epoxy ring opening. A chemical representation of the alternative form of the reaction product prior to adding the acid is disclosed below.

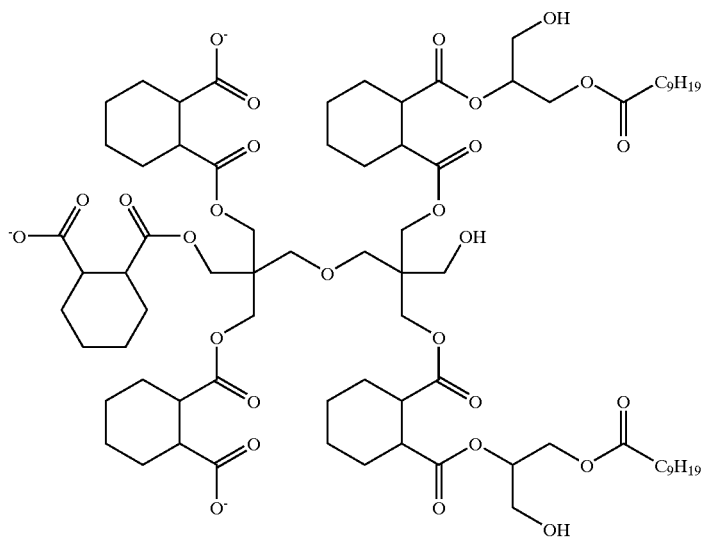

Next, an acid for controlling a pH of the polymeric pigment dispersant in the pigment dispersion is added. The acid is further defined as an acid having at least two functional acid groups for reacting with at least one of the first and the second hydroxyl groups such that the acid improves the stability of the pigment dispersion. The acid improves the stability of the pigment dispersion by increasing the binding between the pigment and the dispersant such that the pigment is more effectively 'wetted.' The acid also allows for increased pigment loading of the pigment in the pigment dispersion. Preferably, the acid reacts with the second hydroxyl groups and is selected from the group consisting of polyphosphoric acid, sulfuric acid, sulfurous acid, dicarboxylic acids, and mixtures thereof.

Most preferably, the acid is polyphosphoric acid. The polyphosphoric acid has three functional acid groups for reacting with at least one of the first and the second hydroxyl groups. The acid is present in an amount from 0.5 to 10 parts by weight based on 100 parts by weight of the polymeric pigment dispersant.

Preferably, the acid is present from 0.5 to 8, and more preferably 0.5 to 5 parts by weight based on 100 parts by weight of the polymeric pigment dispersant. Additional amine may also be used to further control the pH of the pigment dispersant after the acid has been added. The pH of the pigment dispersant is from 7 to 12, preferably from 7 to 10, and more preferably from 7.3 to 8.5. The pH of the pigment dispersant affects the pH of the pigment dispersion. As expected, the higher the pH of the dispersant tends to result in the pigment dispersion having a higher pH. A chemical representation of the acid that has reacted with one of the second hydroxyl groups is disclosed below.

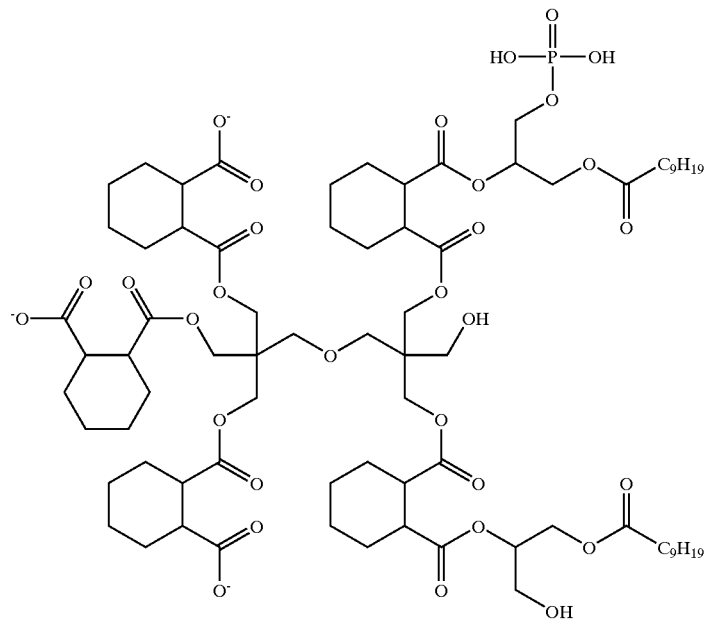

A chemical representation of the acid that has reacted with one of the first hydroxyl groups is disclosed below.

The structural chemical representations disclosed above include a six-branch organic structure dependent on the first

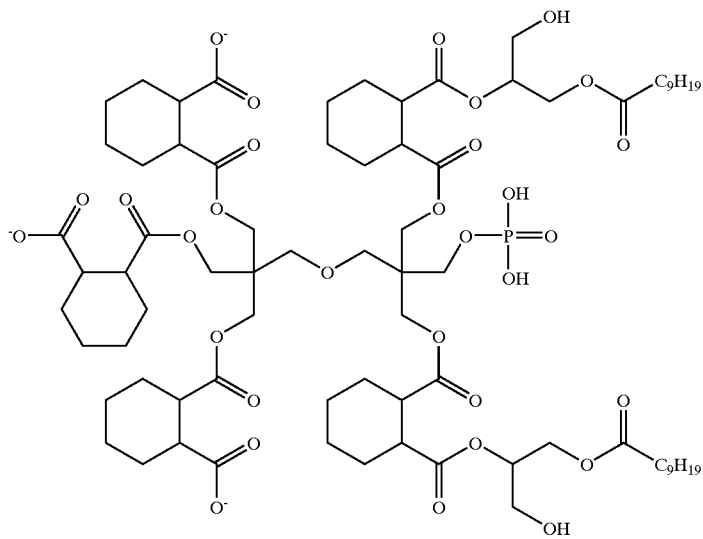

As shown above in either of the alternative embodiments, the polymeric pigment dispersant is a polyester carboxylate having a two-dimensional, six-branch organic structure. The alternative embodiments of the polymeric pigment dispersant can be generically represented as indicated below.

compound, dipentaerythritol. However, the polymeric pigment dispersant of the preferred embodiment need not be limited to dipentaerythritol. Instead, the polymeric dispersant can be more generically represented as indicated below.

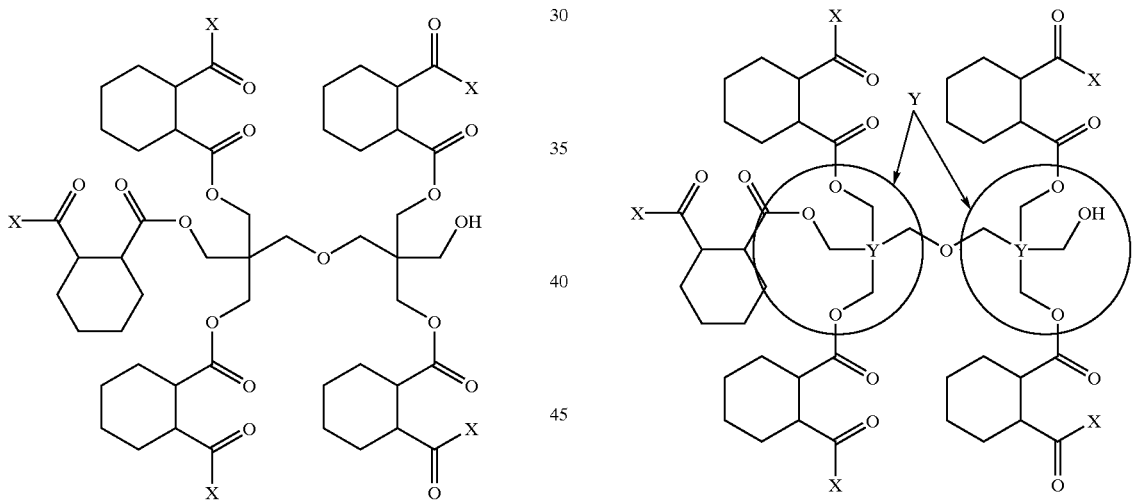

In this representation of the polymeric pigment dispersant according to the subject invention, X is selected from the group consisting of (i) O⁻, and (ii) $R_1$ wherein $R_1$ is a compound having at least one oxygen atom and from 6 to 20 carbon atoms. In the preferred embodiment where the completed polymeric pigment dispersant is in part derived from glycidylneodecanoate, $R_1$ is either

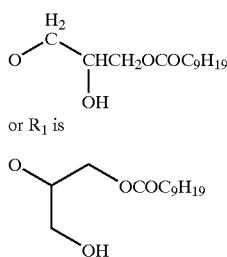

or $R_1$ is

In this representation, Y can be selected from the group consisting of $C_2$ to $C_{20}$ hydrocarbons having three hydroxyl groups. X is selected as above. That is, X is selected from the group consisting of (i) O⁻, and (ii) $R_1$, wherein $R_1$ is a compound having at least one oxygen atom and from 6 to 20 carbon atoms.

The polymeric pigment dispersant has a weight-average molecular weight, $M_w$, of 3000 or less. Preferably, the molecular weight is from 500 to 2000, and more preferably, from 800 to 1600. Additionally, the polymeric pigment dispersant of the subject invention has a non-volatile content of from 45 to 65, preferably from 45 to 55, percent non-volatile by weight. Pigment dispersions utilizing this polymeric pigment dispersant have pigment-to-binder ratios from 10 to 30 and preferably from 12 to 25. The pigment particles have a particle size of less than six microns. That is, the grind resin of the subject invention is robust enough to permit the inorganic pigments dispersed within to be ground or milled long enough to achieve pigment particle sizes of less than six microns without degradation and coagulation of the grind resin. Furthermore, pigment dispersions utilizing this polymeric pigment dispersant have viscosities of less than 95 Krebs units (ku). A viscosity differential is defined as a difference between an initial viscosity of the pigment dispersion and a viscosity measured after the pigment dispersion is exposed at 110° F. for at least 14 days. The initial viscosities of the pigment dispersion of the subject invention fluctuated within a viscosity differential of about 0 to 15 Kreb units.

The resulting structure of the completed polymeric pigment dispersant of the subject invention essentially 'anchors' the inorganic pigment in the pigment dispersion thereby maintaining the pigment uniformly dispersed throughout the grind resin. More specifically, the acid functionality of the completed polymeric pigment dispersant physically interacts with the metal centers inherent in inorganic pigments by complex or coordinated covalent bonding. This physical interaction keeps the pigment uniformly dispersed throughout the grind resin. Also, as described above, the hydrocarbon chain on the completed polymeric pigment dispersant that is derived from the glycidylneodecanoate, which contains from 6 to 20 carbon atoms, promotes thorough miscibility between the polymeric pigment dispersant and the binder resin of the coating composition.

As indicated above, the coating composition utilizing the polymeric pigment dispersant of the subject invention may be based on a wide range of chemical technologies. These chemical technologies rely on the binder resins including, but not limited to acrylic resins, alkyd resins, polyurethane resins, polyester resins, and mixtures thereof. The pigment dispersant used with these variety of binder resins achieves the same results across chemical technologies. One aspect which allows the pigment dispersant to be versatile is the modified pH. The modified pH also helps to control the pH of the pigment dispersion. The pH of the pigment dispersion is from 7 to 12, preferably from 7 to 10, and more preferably from 7.3 to 8.5.

For clarity, the dimethylethanolamine cation has been omitted from the above chemical representations. It is to be understood that the dimethylethanolamine cation remains in the reaction.

It is to be understood that all of the preceding chemical representations are merely two-dimensional chemical representations and that the structure of these chemical representations may be other than as indicated.

The following examples illustrating the formation of and the use of the polymeric pigment dispersant of the subject invention, as presented herein, are intended to illustrate and not limit the invention.

EXAMPLES

The polymeric pigment dispersant was prepared by adding and reacting the following parts, by weight, unless otherwise indicated.

TABLE 1

| Reactant | Amount (moles) | Amount (grams) |
| --- | --- | --- |
| Dipentaerythritol [DPE] | 1 | 126.91 |
| Hexahydrophthalic anhydride [HHPA] | 3 | 230.25 |
| Glycidylneodecanoate [CARDURA E 10S] | 1 | 118.44 |
| Dimethylethanolamine [DMEA] Solution #1 | — | 96.60 DMEA + 379.53 De-ionized Water |
| Polyphosphoric Acid | — | 10.86 |
| Dimethylethanolamine [DMEA] Solution #2 | — | 15.89 DMEA + 21.52 De-ionized Water |

Per the above table, Table 1, 230.25 grams of HHPA were added to 126.91 grams of DPE. The mixture was heated via a conventional heat supply to a temperature of 120° C. to 125° C., when an exotherm was observed, peaking at approximately 150° to 165° C. After this exotherm, the batch was allowed to cool and was maintained at 130° C. for approximately two hours. Standard titration for acid number revealed that the reaction to form the intermediate compound was complete. Next, 118.44 grams of CARDURA E 10S were added to the intermediate compounds. Once again, the heat supply was activated to heat the temperature of the reaction flask to 120° C. The temperature of the reaction flask increased from between 135° C. to 170° C. within 15 minutes indicating another exotherm, and then the temperature of the reaction flask decreased to 125° C.

Next, the reaction product of the intermediate compound having the reacted CARDURA E 10S was titrated to determine the weight per epoxy (WPE) as an indication of the completeness of the reaction. The reaction product is then allowed to cool for about an hour reaching about 95° C. Next, the acid number of the reaction product is determined. The WPE and the acid number are methods for indicating the completeness of a reaction that are known in the art.

Once it was determined that the reaction between the intermediate compound and the CARDURA E 10S was complete, the reaction product of the intermediate compound and the reacted CARDURA E 10S was then salted with 96.60 grams of DMEA and 379.53 grams water. The amount of DMEA added to salt the reaction product is based upon the acid number determined.

Next, 10.86 grams of polyphosphoric acid was added to form the completed polymeric pigment dispersant. An additional 15.89 grams of DMEA and 21.52 grams of water were added to control the pH of the dispersant.

The completed polymeric pigment dispersant of Table 1 was incorporated into a pigment dispersion according to Table 2.

TABLE 2

| Pigment Dispersion Component | Amount (grams) | Other |
| --- | --- | --- |
| POLYMERIC PIGMENT DISPERSANT | 180 | — |
| De-ionized Water | 430 | — |
| co-solvent [propyl propasol] | 28 | — |
| Pigment [titanium dioxide, $TiO_2$] | 1505 | Added pigment gradually over time and under stirring |
| Appearance Evaluation | N/A | Glossy appearance of pigment dispersion on a 2 mil thickness drawdown |

TABLE 2-continued

| Pigment Dispersion Component | Amount (grams) | Other |
|---|---|---|
| Particle Size Evaluation | N/A | No pigment particles were observed utilizing standard grind gauge method (thus indicating a pigment particle size of less than 6 microns) |
| Stability | Type – shelf RT (room temp.) × 14 days | Acceptable |
| Stability | Type – heat 110° F. × 14 days | Acceptable |

Per the above table, Table 2, 180 grams of the polymeric pigment dispersant and 400 grams of de-ionized water and 28 grams of propyl propasol were added together to prepare the pigment dispersion for the coating composition. Next, 1505 grams of $TiO_2$ pigment were added gradually over time and under stirring to the polymeric pigment dispersant/the de-ionized water/propyl propasol blend. An additional 30.0 grams of de-ionized water were added to the blend having the $TiO_2$ pigment. The pigment dispersion was then dispersed with a Cowles blade at 3000 RPM for thirty minutes. After this, the appearance of the pigment dispersion was evaluated by a 2 mil thickness drawdown. The evaluation of the pigment dispersion utilizing the polymeric pigment dispersant of the subject invention concluded a glossy appearance. Additionally, the particle size of the pigment dispersion was determined utilizing a standard grind gauge method. No pigment particles were observed which indicates that the pigment particle size is less than 6 microns.

The stability of this pigment dispersion was also evaluated. As shown in Table 2, for both standard shelf stability and standard heat stability, the stability results of the pigment dispersion were acceptable. Table 3 below lists the results of several tests for different pigment dispersions. The different pigment dispersions are modified to produce the pigment dispersant having different molecular weights, while still achieving the results of the subject invention.

TABLE 3

|  | Example 1 (Table 1 & 2) | Example 2 | Example 3 | Example 4 | Comparative Example 1 |
|---|---|---|---|---|---|
| # Moles Carboxylic Acid Anhydride in Dispersant | 3 | 3 | 5 | 5 | 5 |
| # Moles CARDURA E 10S in Dispersant | 1 | 1 | 2 | 2 | 2 |
| Molecular Weight of Dispersant, grams | 1027 | 1027 | 1562 | 1562 | 1562 |
| % Polyphosphoric Acid in Dispersant | 1.086 | 2.0 | 1.0 | 1.8 | None |
| Dispersant pH | 7.72 | 7.78 | 8.5 | 8.25 | 9.45 |
| Pigment to Binder Ratio of Dispersion | 12.32 | 12.55 | 16.63 | 16.62 | 19.71 |
| % Pigment Load | 60.00 | 50.00 | 71.42 | 70.00 | 71.03 |
| Initial Dispersion pH | 7.94 | 8.12 | 8.38 | 8.34 | 8.99 |
| Initial Dispersion Viscosity, ku | 58 | 59 | 87 | 96 | 72 |
| Initial Dispersion Grind Gauge, microns | <6 | <6 | <6 | <6 | <6 |
| Dispersion pH @ 14 days, Shelf | 7.98 | 8.13 | 8.26 | 8.22 | 8.90 |
| Dispersion Viscosity @ 14 days, Shelf | 61 | 58 | 96 | 98 | 75 |
| Dispersion Grind @ 14 days, Shelf | <6 | <6 | <6 | <6 | <6 |
| Dispersion pH @ 14 days, 110° F. | 8.01 | 7.87 | 8.02 | 7.99 | 8.68 |
| Dispersion Viscosity @ 14 days, 110° F. | 56 | 52 | 95 | 96 | 95 |
| Dispersion Grind @ 14 days, 110° F. | <6 | <6 | <6 | <6 | <6 |

Comparative Example 1, having no acid, had an initial viscosity of 72 ku. After 14 days at room temperature, the viscosity increased to 75 ku. After 14 days at 110° F., the viscosity increased to 95 ku. The viscosity differential of Comparative Example 1 was 23 ku, or an increase of 32%. Example 1 has a viscosity differential of 8 ku, or an increase of 9.2%. Example 2 has a viscosity differential of 0 ku, or an increase of 0%. Example 3 and Example 4 have a viscosity differential of 2 ku and 7 ku, respectively, therefore resulting in a more stable dispersion. The dispersant pH of Examples 1–4 is in the range of 7.72 and 8.5, whereas Comparative Example 1 has the dispersant pH of 9.45. Furthermore, the initial dispersion pH of Examples 1–4 is in the range of 7.94 to 8.38, whereas Comparative Example 1 has the initial dispersion pH of 8.99. The increased stability of Examples 1–4, increases the shelf life due the modified pH.

One aspect of the pigment dispersions of the subject invention is the ability of the pigment dispersions to be used in coating compositions having various chemical technologies. In particular, the pigment dispersions have improved compatibility with various resins. Example 5, below in Table 4, is a pigment dispersion having the pigment dispersant of the subject invention, which is then incorporated into three different coating compositions, shown in Table 5.

The pigment dispersion of Table 4, Example 5, was prepared in accordance with Table 1 and Table 2. However, the pigment dispersant of example 5 has three moles of carboxylic acid anhydride to one mole of DPE. The pigment dispersant also has between one and two percent polyphosphoric acid. The initial grind gauge, initial dispersion pH, and viscosity are listed in Table 4.

TABLE 4

| Example 5 Dispersion Composition | |
|---|---|
| # Moles Carboxylic Acid Anhydride in the Pigment Dispersant | 3 |
| # Moles CARDURA E 10S in Dispersant | 1 |
| % Polyphosphoric Acid | 1.0 |
| Dispersant pH | 7.71 |
| Initial Dispersion pH | 7.98 |
| Initial Dispersion Viscosity, ku | 84 |
| Initial Dispersion Grind Gauge, microns | <6 |
| % Pigment Load | 68.67 |
| Pigment to Binder Ratio of Dispersion | 12.09 |

Example 5 was then incorporated into Examples 5A–5C shown in Table 5. Examples 5A–5C each have a different binder resin making up the coating composition. Table 5 details the coating composition components and the respective percentages.

TABLE 5

| Coating Composition Component | Example 5A | Example 5B | Example 5C |
|---|---|---|---|
| Pigment Dispersion (Table 4) | 29.9% | 29.9% | 26.1% |
| Polyester-Polyurethane Resin | 37.5% | 13.8% | 0.0% |
| Acrylic Resin | 0.0% | 23.7% | 0.0% |
| Acrylic Emulsion | 0.0% | 0.0% | 33.5% |
| Melamine | 7.5% | 7.5% | 6.1% |
| De-ionized Water | 6.3% | 6.3% | 15.7% |
| Co-Solvent | 9.6% | 9.6% | 6.5% |
| Rheology Control Agents | 6.8% | 6.8% | 1.2% |
| Aluminum Pigment Slurry | 1.5% | 1.5% | 1.2% |
| UV Screener | 0.7% | 0.7% | 0.3% |
| pH Control Agent | 0.2% | 0.2% | 1.3% |

TABLE 5-continued

| Coating Composition Component | Example 5A | Example 5B | Example 5C |
|---|---|---|---|
| Filler | 0.0% | 0.0% | 3.7% |
| Free Resin | 0.0% | 0.0% | 3.5% |
| Catalyst | 0.0% | 0.0% | 0.9% |

The coating compositions of Table 5 were applied to a substrate and tested. The coating compositions in Table 5 were utilized as a basecoat and were applied to the substrate. The basecoat was then flashed at 130° F. Next, a clearcoat, commercially available from BASF Corporation, Southfield, Mich., as Duraclear, was applied to the flashed basecoat. The clearcoat was then flashed for ten minutes at 180° F. Next, the substrate having the basecoat and the clearcoat was baked for 25 minutes at 270° F. to cure. The substrate was subjected to initial testing after for 24 hours. The substrate was tested for gloss according to ASTM #D4585 both after the substrate cooled and after the baked substrate was exposed to 140 degrees F. and 100% humidity for 16 hours. The substrate was also subjected to a cross-hatch adhesion test, known in the art as the Chrysler Adhesion Test #LP463-PB1501. The results are listed in Table 6.

TABLE 6

| | Initial (Cooled 24 hours) | | 16 Hours at 140° F. | |
|---|---|---|---|---|
| | Adhesion Loss | Gloss | Adhesion Loss | Gloss |
| Example 5A | 0% | 85 | 0% | 88 |
| Example 5B | 0% | 85 | 0% | 86 |
| Example 5C | 0% | 89 | 0% | 87 |

An acceptable gloss value is greater than 77, and an acceptable adhesion value is less than 10%. The results listed in Table 6 demonstrate that the polymeric pigment dispersion of Table 4 is compatible with each of the binder resins listed is Table 5.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A polymeric pigment dispersant having improved stability in a pigment dispersion for achieving efficient wetting and grinding of a pigment in the pigment dispersion, said polymeric pigment dispersant comprising the reaction product of:
   a first compound having a plurality of first hydroxyl groups;
   a carboxylic acid anhydride reactive with said first hydroxyl groups to form a carboxylate group;
   a second compound having at least one epoxy group reactive with said carboxylate group to form a second hydroxyl group;
   an amine reactive with said carboxylate group to form an acid anion group for salting the carboxylate group; and
   an acid for controlling a pH of the polymeric pigment dispersant such that the polymeric pigment dispersant has improved stability in the pigment dispersion in response to the modification of said pH.

2. A polymeric pigment dispersant as set forth in claim 1 wherein said acid is further defined as an acid having at least two functional acid groups for reacting with at least one of said first and said second hydroxyl groups such that said acid improves the stability of the pigment dispersion.

3. A polymeric pigment dispersant as set forth in claim 2 wherein said acid is polyphosphoric acid having three functional acid groups for reacting with at least one of said first and said second hydroxyl groups.

4. A polymeric pigment dispersant as set forth in claim 3 wherein said acid is present in an amount from 0.5 to 10 parts by weight based on 100 parts by weight of the polymeric pigment dispersant.

5. A polymeric pigment dispersant as set forth in claim 4 wherein said first compound is dipentaerythritol and wherein said first plurality hydroxyl groups is further defined as six hydroxyl groups for reacting with at least one of said carboxylic acid anhydride and said acid.

6. A polymeric pigment dispersant as set forth in claim 5 including a pH from about 7 to about 12 for improving the stability of the dispersant.

7. A polymeric pigment dispersant as set forth in claim 5 including a pH from about 7 to about 10 for improving the stability of the dispersant.

8. A polymeric pigment dispersant as set forth in claim 5 including a pH from about 7.3 to about 8.5 for improving the stability of the dispersant.

9. A polymeric pigment dispersant as set forth in claim 1 wherein the molar ratio of said carboxylic acid anhydride to said first compound is from 2:1 to 20:1.

10. A polymeric pigment dispersant as set forth in claim 2 wherein said acid is selected from the group consisting of polyphosphoric acid, sulfuric acid, sulfurous acid, dicarboxylic acids, and mixtures thereof.

11. A polymeric pigment dispersant as set forth in claim 10 wherein said acid is present in an amount from 0.5 to 10 parts by weight based on 100 parts by weight of the polymeric pigment dispersant.

12. A polymeric pigment dispersant as set forth in claim 11 wherein said first compound is dipentaerythritol and wherein said first plurality hydroxyl groups is further defined as six hydroxyl groups for reacting with at least one of said carboxylic acid anhydride and said acid.

13. A polymeric pigment dispersant as set forth in claim 12 wherein the molar ratio of said carboxylic acid anhydride to said dipentaerythritol is from 2:1 to 6:1.

14. A polymeric pigment dispersant as set forth in claim 13 wherein the molar ratio of said carboxylic acid anhydride to said dipentaerythritol is 5:1 and said polymeric pigment dispersant has a molecular weight of from about 1300 to about 2000.

15. A polymeric pigment dispersant as set forth in claim 13 wherein the molar ratio of said carboxylic acid anhydride to said dipentaerythritol is 3:1 and said polymeric pigment dispersant has a molecular weight of from about 800 to about 1200.

16. A polymeric pigment dispersant as set forth in claim 1 wherein said first compound is selected from the group consisting of erythritol, pentaerythritol, dipentaerythritol, trimethylolethane, trimethylolpropane, dulcitol, threitol, and mixtures thereof.

17. A polymeric pigment dispersant as set forth in claim 16 wherein said first compound is present in an amount from 1 to 20 parts by weight based on 100 parts by weight of the polymeric pigment dispersant.

18. A polymeric pigment dispersant as set forth in claim 1 wherein said carboxylic acid anhydride is selected from the group consisting of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof.

19. A polymeric pigment dispersant as set forth in claim 18 wherein said carboxylic acid anhydride is present in an amount from 15 to 45 parts by weight based on 100 parts by weight of the polymeric pigment dispersant.

20. A polymeric pigment dispersant as set forth in claim 1 wherein said second compound has from 6 to 20 carbon atoms.

21. A polymeric pigment dispersant as set forth in claim 20 wherein said second compound is selected from the group consisting of glycidylneodecanoate, dodecyl oxide, tetradecyl oxide, octadecyl oxide, cyclohexene oxide, and mixtures thereof.

22. A polymeric pigment dispersant as set forth in claim 21 wherein said second compound is present in an amount from 7 to 25 parts by weight based on 100 parts by weight of the polymeric pigment dispersant.

23. A polymeric pigment dispersant as set forth in claim 1 wherein said amine is selected from the group consisting of dimethylethanolamine, amino methyl propanol, and mixtures thereof.

24. A polymeric pigment dispersant as set forth in claim 23 wherein the molar ratio of said amine to said second compound is from 1:1 to 20:1.

25. A polymeric pigment dispersant as set forth in claim 24 wherein said amine is present in an amount from 5 to 35 parts by weight based on 100 parts by weight of the polymeric pigment dispersant.

26. A polymeric pigment dispersant as set forth in claim 1 having a molecular weight of 3000 or less.

27. A polymeric pigment dispersant as set forth in claim 1 having a non-volatile content of from 45 to 65 percent non-volatile by weight.

28. A polymeric pigment dispersion having improved stability for use in a coating composition, said polymeric pigment dispersion comprising:
   a pigment; and
   a polymeric pigment dispersant comprising the reaction product of;
   a first compound having a plurality of first hydroxyl groups,
   a carboxylic acid anhydride reactive with said hydroxyl groups to form a carboxylate group,
   a second compound having at least one epoxy group reactive with said carboxylate group to form a second hydroxyl group,
   an amine reactive with said carboxylate group to form an acid anion group for salting the carboxylate group, and
   an acid for controlling a pH of the polymeric pigment dispersant such that the polymeric pigment dispersant has improved stability in the pigment dispersion in response to the modification of said pH.

29. A polymeric pigment dispersion as set forth in claim 28 wherein said acid comprises an acid having at least two functional acid groups for reacting with at least one of said first and said second hydroxyl groups such that said acid improves the stability of the pigment dispersion.

30. A polymeric pigment dispersion as set forth in claim 29 wherein said acid is polyphosphoric acid having three functional acid groups for reacting with at least one of said first and said second hydroxyl groups.

31. A polymeric pigment dispersion as set forth in claim 30 wherein said acid is present in an amount from 0.5 to 10 parts by weight based on 100 parts by weight of the polymeric pigment dispersant.

32. A polymeric pigment dispersion as set forth in claim 31 wherein said first compound is dipentaerythritol and wherein said first plurality hydroxyl groups includes six hydroxyl groups for reacting with at least one of said carboxylic acid anhydride and said acid.

33. A polymeric pigment dispersion as set forth in claim 32 including a pH from about 7 to about 12 for improving the stability of the dispersant.

34. A polymeric pigment dispersion as set forth in claim 32 including a pH from about 7 to about 10 for improving the stability of the dispersant.

35. A polymeric pigment dispersion as set forth in claim 32 including a pH from about 7.3 to about 8.5 for improving the stability of the dispersant.

36. A polymeric pigment dispersion as set forth in claim 28 including a viscosity differential of from 0 to about 15 wherein said viscosity differential is defined as a difference between an initial viscosity of said pigment dispersion and a viscosity measured after said pigment dispersion is exposed at 110° F. for at least 14 days.

37. A polymeric pigment dispersion as set forth in claim 28 wherein said first compound is selected from the group consisting of erythritol, pentaerythritol, dipentaerythritol, trimethylolethane, trimethylolpropane, dulcitol, threitol, and mixtures thereof.

38. A polymeric pigment dispersion as set forth in claim 37 wherein said carboxylic acid anhydride is selected from the group consisting of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof.

39. A polymeric pigment dispersion as set forth in claim 38 wherein said second compound has from 6 to 20 carbon atoms.

40. A polymeric pigment dispersion as set forth in claim 39 wherein said second compound is selected from the group consisting of glycidylneodecanoate, dodecyl oxide, tetradecyl oxide, octadecyl oxide, and cyclohexene oxide, and mixtures thereof.

41. A polymeric pigment dispersion as set forth in claim 40 wherein said amine is selected from the group consisting of dimethylethanolamine and amino methyl propanol, and mixtures thereof.

42. A polymeric pigment dispersion as set forth in claim 28 wherein said polymeric pigment dispersant has a molecular weight of 3000 or less.

43. A polymeric pigment dispersion as set forth in claim 28 wherein said polymeric pigment dispersant has a non-volatile content of from 45 to 65 percent non-volatile by weight.

44. A method of preparing a polymeric pigment dispersant having improved stability in a pigment dispersion for achieving efficient wetting and grinding of a pigment in the dispersion, said method comprising the steps of:
   (i) reacting a first compound having a plurality of first hydroxyl groups with a carboxylic acid anhydride to form an intermediate compound having a plurality of carboxylate groups;
   (ii) reacting at least one of the carboxylate groups of the intermediate compound with a second compound having at least one epoxy group to form at least one second hydroxyl group;
   (iii) reacting at least one of the other carboxylate groups of the intermediate compound with an amine; and
   (iv) reacting an acid with at least one of the first and the second hydroxyl groups for improving the stability of the pigment dispersion.

45. A method as set forth in claim 44 wherein the steps of (i) reacting the first compound with the carboxylic acid anhydride, (ii) reacting at least one of the carboxylate groups of the intermediate compound with the second compound, (iii) reacting the other of the carboxylate groups of the intermediate compound with the amine, and (iv) reacting an acid with at least one of the first and the second hydroxyl groups are conducted at a temperature between 50° C. and 200° C.

46. A method as set forth in claim 44 wherein the step of reacting the acid is further defined as reacting an acid having at least two functional acid groups for reacting with at least one of the first and the second hydroxyl groups such that the acid improves the stability of the pigment dispersion.

47. A method as set forth in claim 44 wherein the step of reacting the acid is further defined as the step of reacting polyphosphoric acid having three functional acid groups for reacting with at least one of said first and said second hydroxyl groups.

48. A method as set forth in claim 44 wherein the first compound is selected from the group consisting of erythritol, pentaerythritol, dipentaerythritol, trimethylolethane, trimethylolpropane, dulcitol, threitol, and mixtures thereof.

49. A method as set forth in claim 48 wherein the first compound is dipentaerythritol.

50. A method as set forth in claim 44 wherein the carboxylic acid anhydride is selected from the group consisting of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof.

51. A method as set forth in claim 50 wherein the carboxylic acid anhydride is hexahydrophthalic anhydride.

52. A method as set forth in claim 44 wherein the second compound is selected from the group consisting of glycidylneodecanoate, dodecyl oxide, tetradecyl oxide, octadecyl oxide, and cyclohexene oxide, and mixtures thereof.

53. A method as set forth in claim 52 wherein the second compound is glycidylneodecanoate.

54. A method as set forth in claim 44 wherein the amine is selected from the group consisting of dimethylethanolamine and amino methyl propanol, and mixtures thereof.

55. A method as set forth in claim 54 wherein the amine is dimethylethanolamine.

56. A method as set forth in claim 44 wherein the step of reacting the first compound with the carboxylic acid anhydride is further defined as reacting one mole of dipentaerythritol with three moles of hexahydrophthalic anhydride to form the intermediate compound having three carboxylate groups.

57. A method as set forth in claim 56 wherein the step of reacting at least one of the carboxylate groups of the intermediate compound with the second compound is further defined as reacting one of the three carboxylate groups of the intermediate compound with one moles of glycidylneodecanoate.

58. A method as set forth in claim 57 wherein the step of reacting the other of the carboxylate groups of the intermediate compound with the amine is further defined as reacting the remaining two of the three carboxylate groups of the intermediate compound with two moles of dimethylethanolamine.

59. A coating composition comprising:
a resin;
a cross-linking agent reactive with said resin; and
a pigment dispersion comprising;
a pigment, and
a polymeric pigment dispersant, said polymeric pigment dispersant comprising the reaction product of,
a first compound having a plurality of first hydroxyl groups,
a carboxylic acid anhydride reactive with said first hydroxyl groups to form a carboxylate group,
a second compound having at least one epoxy group reactive with said carboxylate group to form a second hydroxyl group,
an amine reactive with said carboxylate group to form an acid anion group for salting the carboxylate group, and
an acid for controlling a pH of the polymeric pigment dispersant such that the polymeric pigment dispersant has improved stability in the pigment is persion in response to the modification of said pH and wherein said pigment dispersant has improved compatibility with said resin.

60. A coating composition as set forth in claim 59 wherein said acid is further defined as an acid having at least two functional acid groups for reacting with at least one of said first and said second hydroxyl groups such that said acid improves the stability of the pigment dispersion.

61. A coating composition as set forth in claim 60 wherein said acid is polyphosphoric acid having three functional acid groups for reacting with at least one of said first and said second hydroxyl groups.

62. A coating composition as set forth in claim 61 wherein said acid is present in an amount from 0.5 to 10 parts by weight based on 100 parts by weight of the polymeric pigment dispersant.

63. A coating composition as set forth in claim 62 wherein said polymeric pigment dispersion of the coating composition has a pH from about 7 to about 12 for improving the stability of the dispersant.

64. A coating composition as set forth in claim 62 wherein said polymeric pigment dispersion of the coating composition has a pH from about 7 to about 10 for improving the stability of the dispersant.

65. A coating composition as set forth in claim 62 wherein said polymeric pigment dispersion of the coating composition has a pH from about 7.3 to about 8.5 for improving the stability of the dispersant.

66. A coating composition as set forth in claim 62 wherein said first compound is dipentaerythritol and wherein said first plurality hydroxyl groups includes six hydroxyl groups for reacting with at least one of said carboxylic acid anhydride and said acid.

67. A coating composition as set forth in claim 66 selected from the group consisting of waterborne basecoats, waterborne clearcoats, waterborne primer surfacers, and mixtures thereof.

68. A coating composition as set forth in claim 66 wherein said resin is selected from the group consisting of acrylic resins, alkyd resins, polyurethane resins, polyester resins, and mixtures thereof.

69. A polymeric pigment dispersant having improved stability in a pigment dispersion for achieving efficient wetting and grinding of a pigment in the pigment dispersion, said polymeric pigment dispersant being of the general formula:

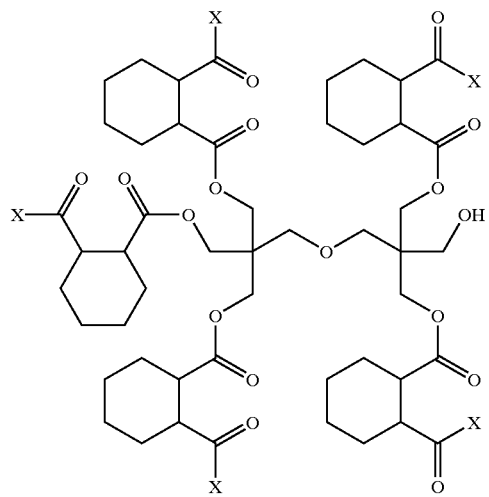

wherein X is selected from the group of;
(i) O⁻; and
(ii) $R_1$;
wherein $R_1$ is a compound having at least one oxygen atom and from 6 to 20 carbon atoms.

70. A polymeric pigment dispersant as set forth in claim 69 wherein $R_1$ is further defined as

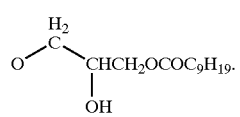

71. A polymeric pigment dispersant as set forth in claim 69 wherein $R_1$ is further defined as

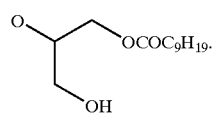

* * * * *